United States Patent [19]

Kelch et al.

[11] Patent Number: 6,166,323
[45] Date of Patent: Dec. 26, 2000

[54] ENCAPSULATED GAS ISOLATED HIGH VOLTAGE INSTALLATION WITH A PARTITIONED CONNECTOR COMPONENT

[75] Inventors: Thomas Kelch, Berlin; Mario Kieper, Falkensee; Christoph Bräunlich, Schönefeld, all of Germany

[73] Assignee: Siemens AG, Munich, Germany

[21] Appl. No.: 09/242,310

[22] PCT Filed: Aug. 8, 1997

[86] PCT No.: PCT/DE97/01782

§ 371 Date: Dec. 21, 1999

§ 102(e) Date: Dec. 21, 1999

[87] PCT Pub. No.: WO98/08284

PCT Pub. Date: Feb. 26, 1998

[30] Foreign Application Priority Data

Aug. 16, 1996 [DE] Germany .......................... 196 33 857

[51] Int. Cl.[7] .................................................. H02G 5/06
[52] U.S. Cl. .................................. 174/21 R; 174/21 JS; 174/28
[58] Field of Search .................................. 174/28, 21 R, 174/21 JS, 21 C, 22 C; 285/325

[56] References Cited

U.S. PATENT DOCUMENTS 3,331,911  7/1967  Whitehead ........................... 174/22 C
4,053,700  10/1977  Meyer .................................. 174/21 C
4,323,720  4/1982  Orgeret ............................... 174/21 JS

FOREIGN PATENT DOCUMENTS 0 338 382   10/1989   European Pat. Off. .
5-191912    7/1993    Japan .
7-284214    10/1995   Japan .
8-019134    1/1996    Japan .
296 14 717  8/1997    Japan .

OTHER PUBLICATIONS

H.P. Szente–Varga, "High–Voltage $SF_6$ Switchgear Installations, Applications and Performance," Brown Boveri Review, vol. 62, p. 140, Figure 3, Apr. 1975.

Primary Examiner—Kristine Kincaid
Assistant Examiner—Chau N. Nguyen
Attorney, Agent, or Firm—Kenyon & Kenyon

[57] ABSTRACT

A connecting unit containing a four-segment inner conductor connection in an enclosure provided with two partitioning insulators and a installation opening, is used to provide easy mechanical access to an inner conductor of two partitioned sections of a gas-insulated, tubular conductor system, with one conductor segment of the inner conductor connection detachably connected in a shape of a claw to adjacent connector segments.

3 Claims, 2 Drawing Sheets

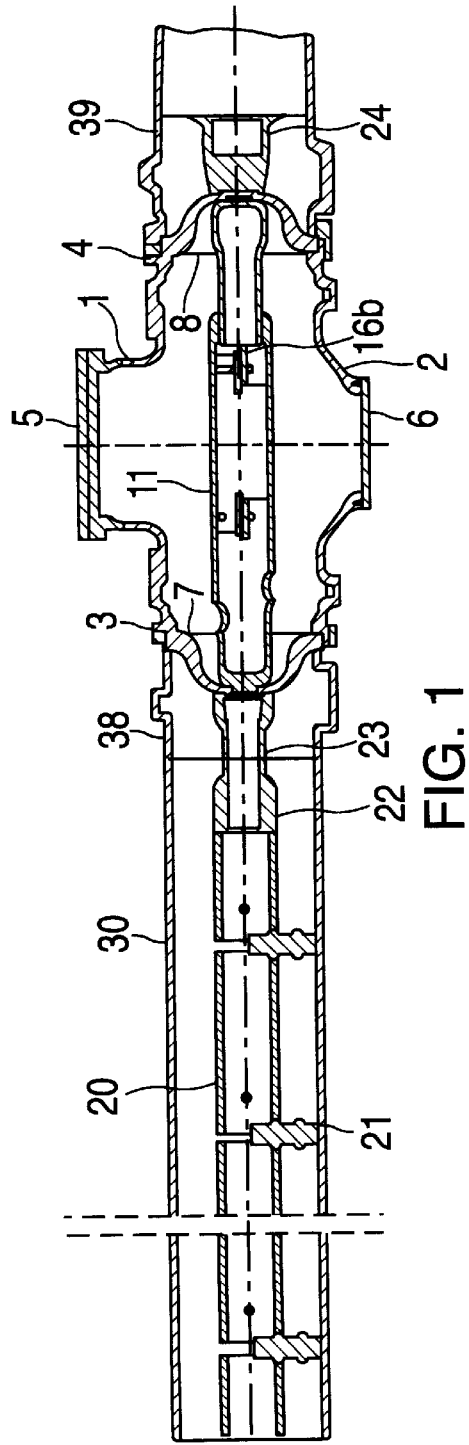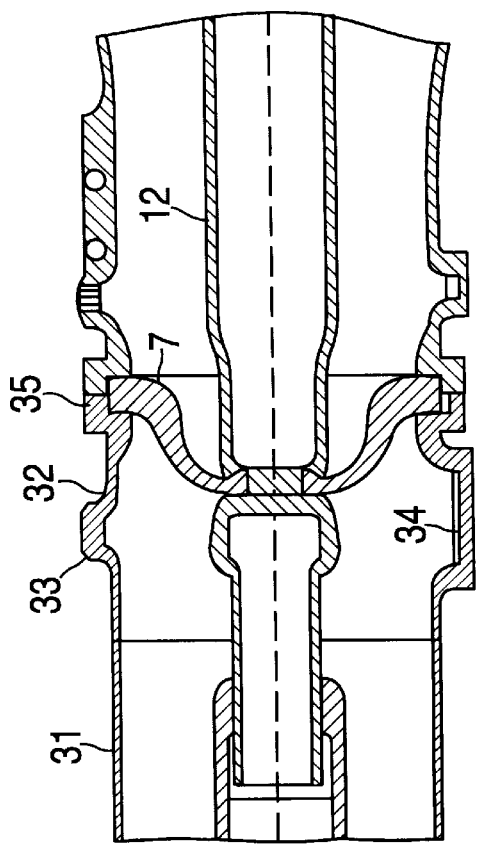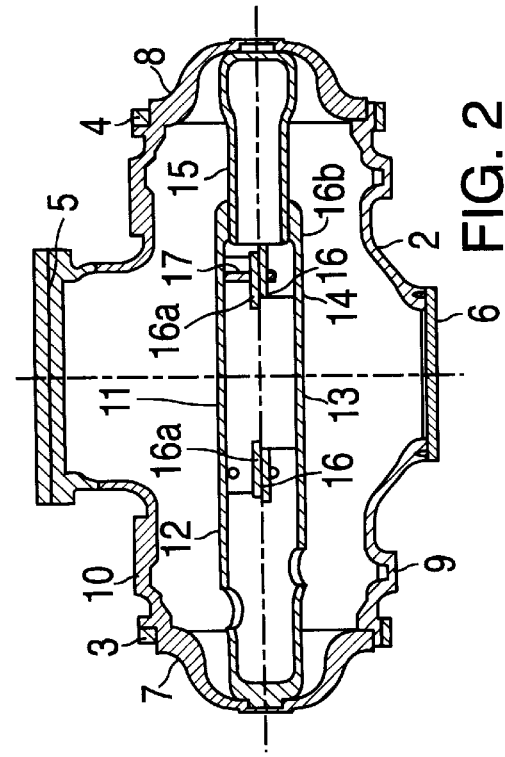

ENCAPSULATED GAS ISOLATED HIGH VOLTAGE INSTALLATION WITH A PARTITIONED CONNECTOR COMPONENT

FIELD OF THE INVENTION

The present invention relates to power distribution, in particular a device for designing enclosed, gas-insulated high-voltage systems having an inner conductor and an outer conductor arranged concentrically to the inner conductor in which, between two enclosed gas chambers, a connecting unit is positioned that includes an enclosure and a multi-segment, detachable inner conductor connection extending in an axial direction as well as two conical partitioning insulators located at flange-like ends of the enclosure.

BACKGROUND INFORMATION

Enclosed, gas-insulated high-voltage switchgear, as described in the publication High-Voltage $SF_6$ Switchgear Installations, Applications and Performance, is commonly provided with a connecting unit in the form of a disconnector between two gas chambers in a system, for example, between a cable inlet a circuit breaker or between the circuit breaker and an adjacent busbar. This connecting unit contains a detachable inner conductor connection extending in an axial direction in an enclosure and is provided, at the ends of the enclosure, with two conical partitioning insulators which extend inside the adjacent gas chambers. The multi-segment inner conductor connection includes a stationary switching contact with an assigned shield electrode fixed axially and radially in one of the partitioning insulators, a contact pin that can move in the axial direction, and a contact pin guide with an assigned shield contact fixed axially and radially on the other partitioning insulator. The contact pin drive is flanged radially onto the perimeter of the enclosure. A further closable opening may be provided for grounding purposes on an opposite side page.

U.S. Pat. Nos. 3,331,911 and 4,053,700 describe gas-insulated power transmission systems with tubular inner conductors and tubular outer conductors also using partitioning insulators in order to separate the gas chambers of the individual system sections from one another. For this purpose, the partitioning insulators are usually clamped tightly between two connecting flanges in the area of the outer conductor, while, in the area of the inner conductor, they are seated leak-proof on the inner conductor or also clamped to form a seal between two inner conductor segments. U.S. Pat. No. 4,323,720 describes another conventional method providing, in the area of one partitioning insulator, an inner conductor connection that may be detached after the system has been assembled, with two longitudinal segments of the inner conductor engaging with each other like claws and being locked in place axially by pins extending through the claws. In the area of this conductor connection, a special housing part is used whose one connecting flange is inclined with respect to the system axis. It is also possible to provide two housing parts of this type one behind the other so that the connecting flanges of both adjacent system sections are positioned at right angles to the tube axis.

SUMMARY OF THE INVENTION

An object of the present invention is to design a connecting unit so that two sections of a gas-insulated power transmission system, in which a tubular inner conductor is supported against a tubular outer conductor by insulating spacers, may be separated from one another, providing access to inner conductors of adjacent gas chambers for test purposes.

This object is achieved according to the present invention in that the inner conductor connection includes four tubular conductor segments, of which the first and second as well as the second and third conductor segments are interconnected like claws so that they may be separated. For this purpose, an enclosure is provided with a closable installation opening, and the third conductor segment plugs into the fourth conductor segment, which is fixed axially in place. The first and fourth conductor segments must be fixed in place axially, using a further conductor segment positioned on the other side of the partitioning insulator. Another important aspect of the present invention is that the enclosure is provided with further closable openings in the area of the first and/or fourth conductor segment.

In such an embodiment of the connecting unit, with the connecting unit positioned between two sections of a gas-insulated power transmission system, the inner conductor of the system may be easily detached by removing the second conductor segment of the multi-segment inner conductor connection, so that the system sections on both sides of the connecting unit may be accessed independently for test purposes. This is done by installing special contact members, on the first and third conductor segments. The contact members may then be accessed alternately, using a test connection mounted over the installation opening. The further closable openings in the enclosure of the connecting unit may be used to vent the connecting unit and refill it with gas, and the inner conductor may also be grounded via such openings.

The connecting unit according to the present invention also may be used to connect additional system sections to the power transmission system, for example to connect a branch or a surge arrester, if the second conductor segment of the four-segment inner conductor connection is T-shaped and the enclosure is provided with a flange-like coupling positioned concentrically to the branching portion of the second conductor segment. This coupling is also assigned a partitioning insulator in which the branching conductor portion of the second conductor segment is arranged axially and fixed radially in place.

To connect the connecting unit to the two adjacent gas chambers of the power transmission system in an easy-to-mount manner, it is also advantageous for the enclosures of the adjacent gas chambers to each be composed of a tubular outer conductor. An end assigned to the connecting unit is of the tubular outer conductor provided with a tubular, cast housing part. This housing part is provided with a connecting flange for connection to the enclosure of the connecting unit, a installation opening arranged in a flange-like manner on the perimeter, and at least one further closable opening arranged on the perimeter. The additional openings are used, in particular, for supplying gas and as entry points for inserting sensors into the gas chamber.

BRIEF DESCRIPTION OF THE DRAWINGS

FIG. 1 shows a power transmission system with a tubular inner conductor and a tubular outer conductor in an area of a connecting unit.

FIG. 2 shows a connecting unit.

FIG. 4 shows a transition between a connecting unit and an adjacent gas chamber.

DETAILED DESCRIPTION

Figure 3:
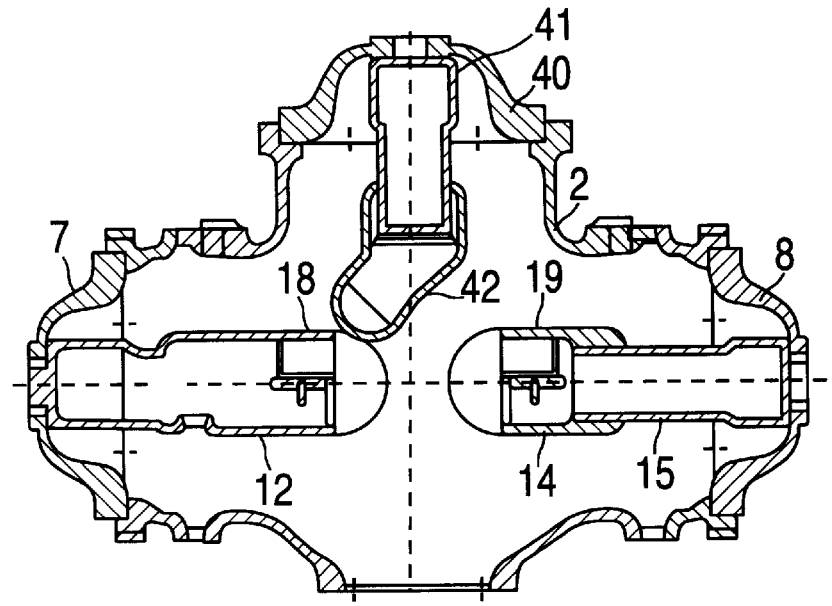
FIG. 3 shows an embodiment of a connecting unit for testing purposes.

FIG. 1 shows connecting unit 1, which is arranged in the length of a gas-insulated tubular conductor system with tubular inner conductor 20 and tubular outer conductor 30. As is also shown in FIG. 2, the connecting unit primarily includes an enclosure 2 and a multi-segment, detachable inner conductor connection 11, with enclosure 2 having connecting flanges 3 and 4 at its ends, a flange-like installation opening 5, and an additional installation opening 6. Located in the area of connecting flanges 3 and 4 are disk-shaped partitioning insulators 7 and 8, which have a conical or key-shaped design and extend into adjacent gas chambers 38 and 39 of the gas-insulated tubular conductor system.

Tubular inner conductor 20 of the tubular conductor system is positioned within tubular outer conductor 30 with the help of insulating spacers 21 arranged at intervals. Tubular inner conductor 20 ends in a plug-in connection 22, whose plug-in contact 23 is connected to inner conductor connection 11 of connecting unit 1. On the other side of the connecting unit is provided an end piece 24 of the tubular inner conductor, which continues at this point, with the end piece connected, through partitioning insulator 8, to a conductor segment of inner conductor connection 11. In the area of two partitioning insulators 7 and 8, the inner conductor connections each form a conductor fixed point, as described in German Patent No. 296 14 717.6.

As shown in FIG. 2, inner conductor connection 11 of connecting unit 1 includes four tubular conductor segments, of which first conductor segment 12 is fixed axially and radially in place within partitioning insulator 7, and fourth conductor segment 15, designed as a tubular plug-in contact, is fixed radially and axially in place on partitioning insulator 8. Third conductor segment 14, which also has a tubular design and is provided with a control electrode designed as a socket-like contact member 166, is mounted on fourth conductor segment 15. Contact member 166 contacts conductor segment 15 via ring-shaped laminated contacts.

Conductor segments 12 and 14 are each provided with a claw 16, arranged toward the middle of connecting unit 1, with which corresponding claws 16a of second tubular conductor segment 13 engage. In the area of these claws, conductor segment 13 may be permanently connected to both conductor segments 12 and 14 in a way that maintains a uniform diameter, using a screw connection 17.

Enclosure 2 is also provided with additional, smaller installation openings 9 and closable bores 10, with bores 10 used, for example, to vent the inner chamber or to fill it with insulating gas, as well as for connection to the adjacent gas chambers of the tubular conductor system.

Second conductor segment 13 can be detached and removed through installation opening 5 of connecting unit 1. As shown in FIG. 3, a contact member 18 or 19 with a spherical electrode can be mounted on first conductor segment 12 and on third conductor segment 14 for test purposes. With the help of a rotatable contact member 42, a test or measurement voltage can then be supplied to these contact members, for which purpose a partitioning insulator 40 with a conductor bushing 41 must be mounted over installation opening 5, and the bushing may be made gastight by using connecting flanges, etc.

As shown in FIG. 4, outer conductor 30 adjacent to the connecting unit is connected, at the end of conductor tube 31, to a cast housing part 32 which has a tubular connecting flange 35. This connecting flange is used to fix partitioning insulator 7 in place or—on the other side of connecting unit 1—to fix partitioning insulator 8 in place axially. Connecting flange 35 is provided with a closable opening 33, for example to supply insulating gas, and an installation opening 34, which is used, for example, to insert sensors into gas chamber 18.

Figure 5:
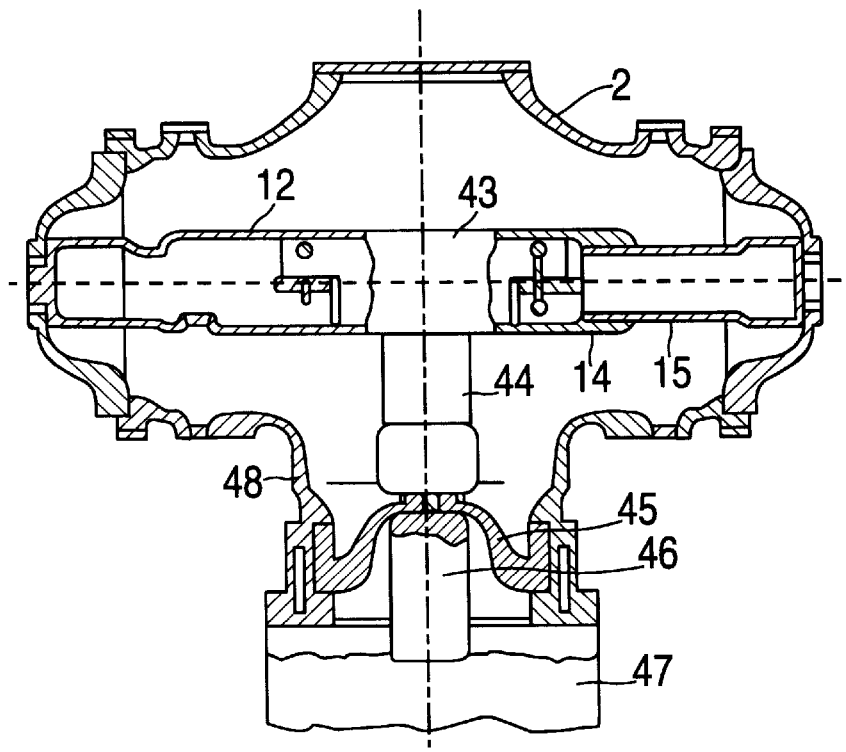
FIG. 5 shows an embodiment of a connecting unit for connecting a further system section, in particular a surge arrester.

As shown in FIG. 5, a surge arrester 47 is flanged onto connecting unit 1, with partitioning insulator 45 connected in-between, and is connected, through coupling 48, to conductor segment 43 via a conductor connection 46. Second conductor segment 43 of the inner conductor connection is designed in the shape of a T, with branching tube section 44 permanently connected to conductor connection 46 or plugging into the latter.

What is claimed is:

1. An enclosed, gas insulated high-voltage system, comprising:

a tubular inner conductor;

a tubular outer conductor, the tubular inner conductor being supported within the tubular outer conductor by conical partitioning insulating spacers; and a connecting unit positioned between two enclosed gas chambers, the connecting unit including an enclosure, a multi-segment detachable inner conductor connection extending in an axial direction, and the spacers, the spacers being located at flange-like ends of the enclosure, a first segment of the inner conductor connection being fixed in place radially on a first one of the spacers, the first segment further being fixed in place axially on a first side of the first one of the spacers via a first conductor segment positioned at a second side of the first one of the spacers, a second segment of the inner conductor connection detachably interconnected to the first segment of the inner conductor connection in a shape of a claw, a third segment of the inner conductor connection detachably interconnected to a fourth segment of the inner conductor connection in the shape of the claw, the fourth segment being fixed in place radially on a second one of the spacers, the fourth segment further being fixed axially on a first side of the second one of the spacers via a second conductor segment positioned at a second side of the second one of the spacers, the spacers being fixed in place axially by a flange connection, the enclosure having a first closable installation opening, and further having second and third closable openings in an area of at least one of the first segment of the inner conductor connection and the fourth segment.

2. The system according to claim 1, wherein the second segment is T-shaped, and the enclosure further includes a flange-like coupling arranged concentrically to a branching portion of the second segment, the flange-like coupling being assigned a third one of the spacers, the branching portion of the second segment being axially and radially fixed in the third one of the spacers.

3. The system according to claim 1, wherein each of the enclosed gas chambers includes the tubular outer conductor, an end of the tubular outer conductor assigned to the connecting unit including a tubular cast housing part, the housing part including a flange connection for coupling to the enclosure of the connecting unit and having a second installation opening and at least one further closable opening on a perimeter of the housing part.

* * * * *